July 11, 1967　　　J. A. LOVE ETAL　　　3,330,503
RE-ENTRY GUIDANCE SYSTEM
Filed Aug. 10, 1964　　　　　　　　　　　2 Sheets-Sheet 1
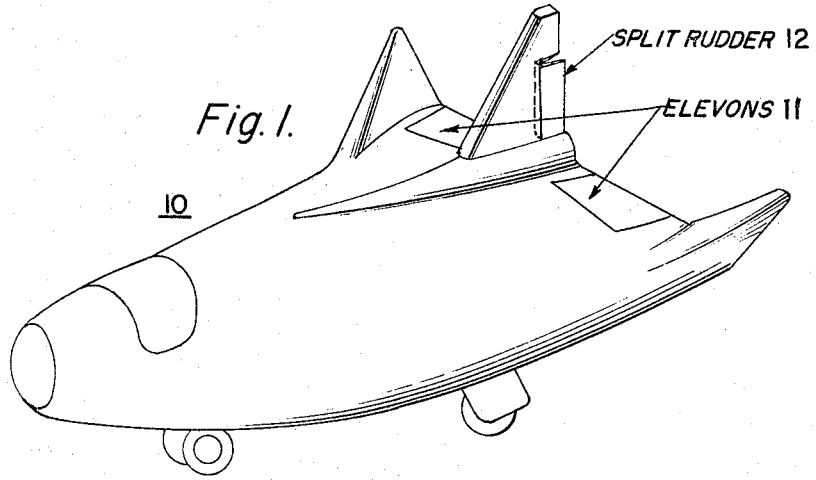
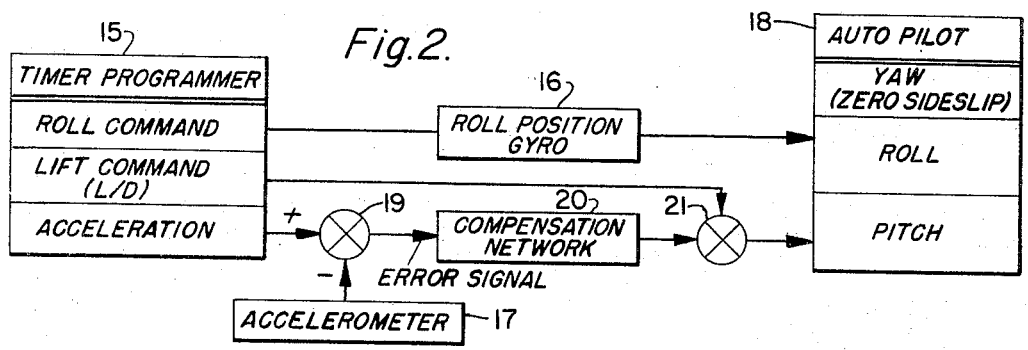
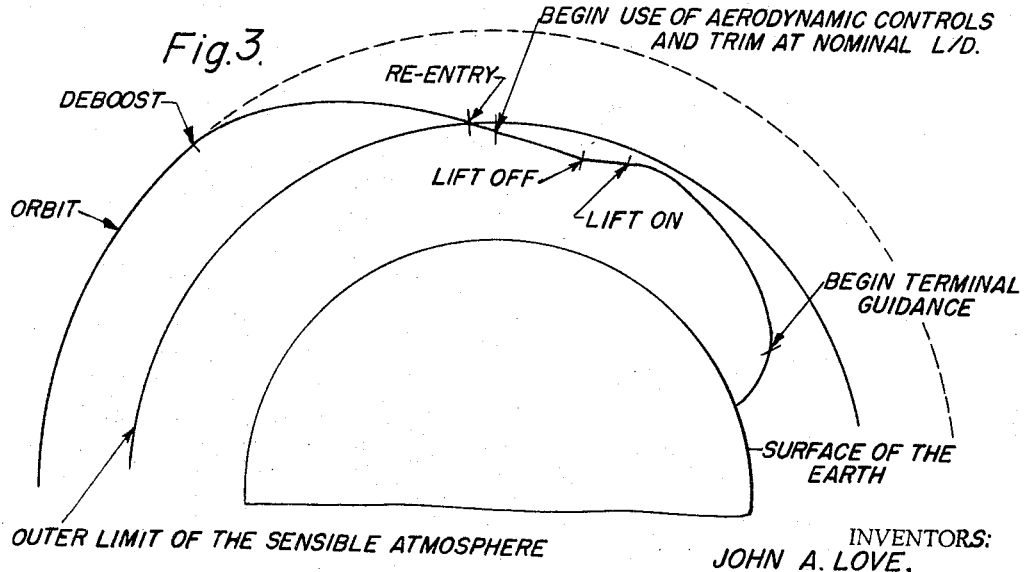
INVENTORS:
JOHN A. LOVE,
LUCIEN W. NEUSTADT,
BY
AGENT.

3,330,503
RE-ENTRY GUIDANCE SYSTEM
John A. Love, Gardena, Calif., and Lucien W. Neustadt, Ann Arbor, Mich., assignors to TRW Inc., a corporation of Ohio
Filed Aug. 10, 1964, Ser. No. 388,594
6 Claims. (Cl. 244—77)

This invention relates to an acceleration monitoring guidance system (AMGS) for use with a lifting vehicle entering a planet's atmosphere at high velocity.

The AMGS is essentially a simple inertial system, using a single precomputed acceleration program and body fixed sensors. A single terminal guidance station such as radar and a radio command link may be used at the landing site. The disclosed AMGS is capable of guiding a lifting vehicle during re-entry in order to land near a pre-selected recovery area. On orbital missions, almost any landing area within the maneuvering range of the vehicle can be selected at any time prior to deboost since only 4 discrete commands need be given the AMGS in order to select a new trajectory.

Lifting re-entry vehicles are used since lift can materially reduce the peak acceleration experienced by the vehicle re-entering from a given initial condition. Negative lift can also be used to prevent vehicles in grazing trajectories from skipping out of the atmosphere. Both effects increase the size of the re-entry corridor from which safe recovery is possible. The corridor is defined by the peak $g$'s encountered at full positive lift and by the skip out limit at full negative lift.

A further and more obvious advantage is vehicle maneuverability. Lift can be used to correct for dispersions in re-entry conditions, as well as to enable the vehicle to fly to landing areas which are not in the orbital plane. The trajectory of the vehicle is controllable by placing the vehicle in a particular roll attitude prior to re-entry, and appropriately varying the vehicle's lift coefficient after re-entry. These characteristics can be exploited to increase the convenience, flexibility, and reliability of the overall recovery system. Besides improving the chances of successful recovery from a given orbital pass by reducing dispersions, a reasonable amount of lateral maneuverability can increase the number of passes from which recovery can be effected in a given landing area. This is a distinct advantage if, for instance, an emergency should occur in a manned orbiting vehicle. Within broad limits, the vehicle may have any velocity and position when a re-entry due to abort occurs. The re-entry guidance system disclosed herein is able to guide the vehicle safely down from those anticipated initial conditions, from which safe descent is physically possible. Many implementations of the AMGS are possible depending on complexity and sophistication desired.

For example, one system would select a safe trajectory to a preselected emergency landing area. A less complicated system could land the vehicle in an arbitrary but predictable area whose location would depend mainly on conditions at abort. This would narrow the search area considerably, compared to what might occur with the simplest of all systems.

The design of a suitable guidance system during re-entry poses many problems. For instance, ground controlled guidance systems have been proposed. Tracking the vehicle and communicating with it are both difficult due to the ion sheath generated around the vehicle during re-entry. In order to take advantage of the vehicle's maneuverability, one or more tracking stations must be placed near the re-entry path, some distance "uprange" from the landing area. This string of tracking stations would not only be expensive, it would also destroy part of the flexibility in choice of trajectory which is one of the main reasons for using a lifting vehicle. Doppler navigation systems are also confronted with the problems of transmitting through the ion sheath, and of detecting the same signal after it is attenuated still more by imperfect reflection.

A conventional inertial guidance system, including a platform and a computer, is comparatively heavy, expensive and very complex. Because the system must (for most missions) first fly in a zero "$g$" environment for a long time and then guide the vehicle for a fairly long time (20 minutes), both initial alignment and drift may pose serious problems.

The acceleration monitoring guidance system (AMGS) described herein is capable of handling a broad class of missions which involve the recovery of a re-entry vehicle and its payload in a "friendly" landing area. It is essentially a very simple inertial guidance system augmented if desired by a single terminal guidance station.

The present invention is used in conjunction with a lifting vehicle capable of re-entering an atmosphere ladened planet from orbit by using components of lift generated by lifting surfaces on the vehicle reacting with the atmosphere during re-entry. On board the vehicle is an acceleration measuring means located in the plane of symmetry of the vehicle for sensing dynamic pressure by measuring accelerations of the vehicle. The dynamic pressure is a function of density and velocity. Prior to re-entry, a timer programmer, having prerecorded indicia of simulated acceleration for a preferred re-entry trajectory of the vehicle in the atmosphere, is started. During re-entry the lifting surfaces are controlled to cause measured acceleration in the vehicle to substantially follow and track the recorded accelerations in the programmed timer. Roll reference is maintained by a position gyro which is aligned and uncaged prior to re-entry. Assuming a manned vehicle it now becomes possible to select a landing site on the planet while in orbit with great flexibility and a minimum of tracking equipment.

Further objects and advantages of this invention will be made more apparent by referring now to the accompanying drawings wherein:

FIGURE 1 illustrates a lifting re-entry vehicle having the basic control surface for affecting lift;

FIGURE 2 is a block diagram of the acceleration monitoring guidance loop for monitoring and controlling acceleration during re-entry;

FIGURE 3 is a two dimensional view illustrating a typical planar trajectory of the vehicle from orbit to landing;

Figure 4:
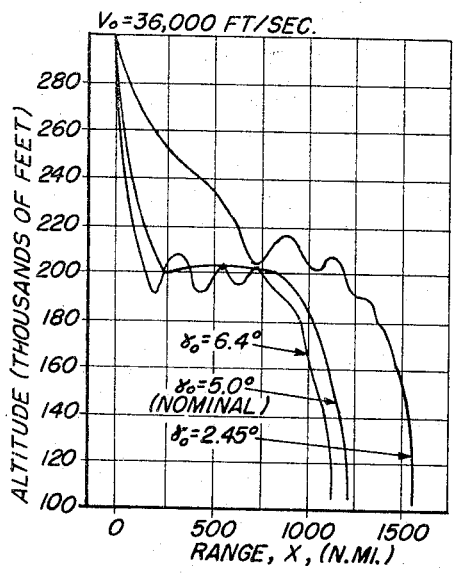
FIGURE 4 is a side view of altitude vs. range illustrating the wide latitudes on re-entry available for a specific lifting vehicle.

Referring now to FIGURE 1, there is shown a representative lifting re-entry vehicle 10 having the necessary lifting control surfaces. The vehicle 10 is controllable by the AMGS during the re-entry phase regardless of the means used to place the vehicle outside the planetary atmosphere. Due to the lack of atmosphere in the orbiting mode the lifting surfaces on vehicle 10 have no effect when in orbit and require reaction controls to effect desired changes in attitude. The problems associated with placing the vehicle in orbit until re-entry of the vehicle in the atmosphere are well known in the art today as demonstrated by recent Mercury shots and the same technology is applicable to the re-entry of the vehicle 10.

In one embodiment, elevons 11, one on each side of a rudder 12, are used for pitch and roll control while the rudder controls yaw. The rubber 12 may be also split and thereby act as a speed brake.

Referring now to FIGURE 2, there is shown a block diagram indicating the major components comprising the invention. A timer programmer 15 contains stored programs of simulated acceleration measurements for a preferred re-entry of the specific vehicle 10 in a specific trajectory and the necessary lift and roll command signals to affect the desired trajectory. For a manned vehicle, the timer programmer 15 may include suitable timing means such as a crystal controlled oscillator cooperating with a tape recorder having a manual start switch depending on the sophistication desired. In addition, a separate command receiver capable of receiving signals from earth (during the orbiting mode) is desirable for controlling the starting of the timer programmer 15.

An attitude sensing device such as a roll position gyro 16 is also required since the lifting surfaces of the vehicle 10 when in the atmosphere must be properly oriented in roll. The cross range maneuverability of the vehicle is determined by combinations of roll attitude and average lift coefficient. The vehicle must therefore enter the atmosphere at the proper roll attitude (not necessarily level) to obtain the programmed trajectory. It is contemplated that other position sensing devices such as a horizon scanner will be available to continually pre-set the roll position gyro 16 since such information is needed prior to deboosting. Present techniques require very accurate roll, pitch and attitude control prior to firing retro-rockets. This is necessary to insure proper re-entry angle of the vehicle into the atmosphere and also to insure the vehicle entering in the proper direction since the heat shield is usually on one side only. In any event, it is only necessary that an inertial guidance quality position gyro 16 be used.

A medium accuracy linear accelerator 17 located in the plane of symmetry of the vehicle 10 is used to measure actual accelerations experienced by the vehicle. Linear accelerometer is sensitive to linear accelerations imposed on the vehicle by aerodynamic, control and propulsion forces. The instrument is body-fixed, i.e., its sensitive axis is aligned permanently with a particular vehicle body axis. The optimum orientation of the accelerometer with respect to the vehicle depends on the vehicle configuration and, to a certain extent, on the class of trajectories to be flown. Thus, for a particular vehicle, the optimum accelerometer sensitive axis orientation might be normal to the vehicle longitudinal (roll) axis. In another particular vehicle, the optimum accelerometer sensitive axis orientation might be along the roll axis. If the vehicle has wings, or other asymmetrical lift generating shaped portions, the linear accelerometer sensitive axis should be in the plane of symmetry in order to measure the optimum component of the net aerodynamically generated acceleration of the vehicle. For axi-symmetric vehicles, the placement of the linear accelerator 17 and the position gyro 16 will serve to define the vehicle's pitch plane. For certain missions, an autopilot 18 may be used in response to the generated roll and pitch commands. The autopilot 18 contemplated is a three axis autopilot which in turn will require at least two rate gyros and a linear accelerometer. The latter is used to maintain zero sideslip so that all aerodynamic forces are in the vehicle's pitch plane. For a manned vehicle, the pilot will control the vehicle by maintaining zero sideslip while responding to the generated roll and pitch command signals.

In many cases, equipment used in the AMGS can be used by other systems prior to re-entry. For instance, the position gyro 16 might be used in a gyro compass mode to provide yaw control while the vehicle is in orbit. Similarly, horizon scanners may be used for attitude reference throughout the extra-atmospheric flight, rather than just prior to re-entry. Or they may not be necessary at all, if the "payload" incorporates some other attitude reference by which the roll gyro can be aligned.

For a typical mission, and probably prior to launch, a family of nominal trajectories is computed which will bring the vehicle safely down from the nominal re-entry conditions to a number of arbitrary landing points. The corresponding vehicle acceleration profiles based on these trajectories are then computed and are stored in the timer programmer 15 as functions of time. For most missions, only one such profile need be stored.

The acceleration profiles are computed as they would be measured by the single accelerometer 17 fixed in a nominal vehicle. The direction of the sensitive axis is preferably chosen to minimize changes in aerodynamic force (along that axis) with changes in angle of attack. During re-entry, the output of the body-fixed, linear accelerometer 17 is compared to the precomputed nominal acceleration curve in an algebraic adder 19 to generate an error signal. The error signal is fed through a compensation network 20 to an algebraic adder 21 which also receives lift commands for generating the resulting pitch signal. Roll reference during re-entry is provided by the body fixed roll position gyro 16 which is aligned (for example by using horizon scanners) and uncaged just prior to re-entry. As mentioned above, the yaw channel of the autopilot is designed to hold sideslip, and thus sideforce, to zero. The compensation network is included in the acceleration error feedback path to:

(a) Enhance stability of the control system which consists of the vehicle, its control force or moment generating mechanisms, the vehicle autopilot, and the acceleration monitoring guidance loop.

(b) Enhance guidance accuracy, i.e., to reduce position and velocity errors during all phases of the trajectory.

For a particular vehicle and mission class, the compensation network might consist of a proportional plus integral path cascaded with a lead-lag network. Persons skilled in the art could derive the appropriate performance parameters for such compensation as well as derive other compensation networks which might be more appropriate for a particular vehicle or mission class.

For some missions, such as a "once around and return" reconnaissance, the timer programmer will be set and started prior to launch. For most missions, however, a command receiver will be used to set in a maximum of four discrete commands prior to re-entry. For orbital missions, as illustrated in FIGURE 3, this will permit the selection of any landing area within the maneuvering range of the vehicle at any time prior to deboost. The four commands are:

(1) Time of deboost
(2) Time between deboost and re-entry
(3) Initial bank angle
(4) Nominal $L/D$ where:
    L is aerodynamic lift force in pounds
    D is aerodynamic drag force in pounds The time of deboost is the primary control of range, and the combination of bank angle and $L/D$ controls crossrange distance.

The timer programmer assumes command a short time prior to re-entry. The roll reference gyro is operated in a gyrocompass mode to ensure that the vehicle is not yawed with respect to its velocity vector. During this time, horizon scanners are used to give a "wings level" attitude. Just prior to re-entry, roll reference is switched from the horizon scanners to the position gyro, and torquing signals are issued to the latter so that the vehicle rolls to the preselected bank angle.

Re-entry is assumed to occur at a fixed time which is chosen so that aerodynamic control is possible. At this time, the vehicle is trimmed to its nominal $L/D$, and closed loop guidance is begun by comparing the vehicle's measured acceleration with the precomputed nominal acceleration curve. Roughly speaking, the $L/D$ is increased if the measured acceleration (or its integral) is too high, and decreased if the converse is true. These small changes in $L/D$ ensure that the vehicle always stays near the desired nominal trajectory as illustrated by the curves in FIGURE 4. By the time the vehicle nears the desired landing site, the velocity is low enough so that ionization no longer interferes with communications or radar tracking. Acquisition is also aided by the fact that the vehicle is near its nominal trajectory, and it is now possible for the terminal guidance station if used to assume control.

Since the terminal guidance is conducted in the atmosphere after re-entry, a single tracking radar at or near the landing site, a digital computer, and a transmitter for commands may be used. The command signals may be used to torque the roll gyro or change the commanded $L/D$ so that the vehicle "homes in" on the desired landing area.

This AMGS does not, in itself, determine what nominal trajectories should be chosen. For successful operation, some a priori knowledge of the vehicle's position and velocity at the time of re-entry is necessary. This requirement is not particularly restrictive since the trajectory prior to re-entry is usually well known. After re-entry, trajectories which can be flown at constant bank angles (with respect to inertial space) and simple $L/D$ programs are desirable because they minimize storage (memory) requirements within the timer programmer. This general requirement is for simplicity only and is not restrictive for any missions of the vehicle.

FIGURE 3 shows a typical re-entry trajectory. The transition from the trajectory at re-entry to a long, shallow glide is accomplished by a very simple "on-off" variation in lift. At re-entry, the vehicle is trimmed at maximum $L/D$. The lift force on the vehicle is small at first, but increases rapidly as the air density increases, and the vehicle pulls out of its ballistic trajectory. Soon after the pullout, the lift is "turned off," i.e., the vehicle is trimmed at zero $L/D$, in order to keep it from skipping back out of the atmosphere. The vehicle then follows a ballistic path upwards until gravity causes it to begin to descend. The lift is turned on again at this time, and if the "lift off" and "lift on" times have been correct, the vehicle will be in a smooth, high altitude glide at its maximum trim $L/D$.

Figure 5:
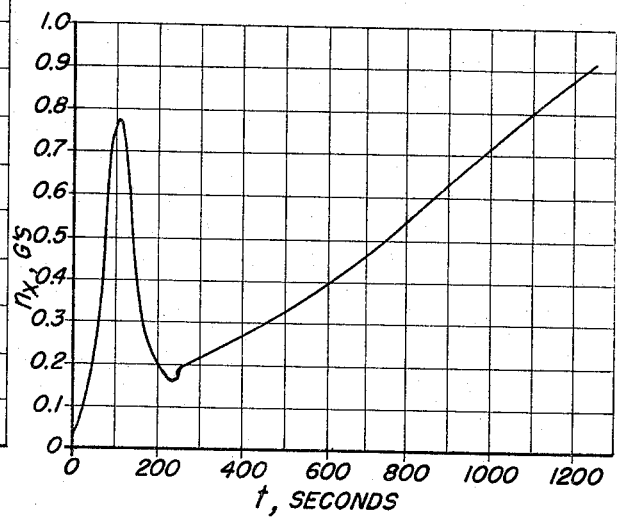
FIGURE 5 is a curve illustrating a typical programmed axial acceleration curve.

This smooth, or "equilibrium" glide permits the vehicle to dissipate energy at high altitude, where accelerations are low. It also permits use of a comparatively simple nominal acceleration curve. FIGURE 5 shows one such nominal acceleration curve as a function of time as it would be stored in the programmer. The step changes in the curve occur when the vehicle's angle of attack is changed to turn the lift "on" and "off."

A very simple change in the above procedure permits turns out of the orbital plane. The vehicle is rolled to a particular bank angle prior to re-entry. The "lift off"-"lift on" times are adjusted because the vertical component of lift is changed. The time histories of altitude, velocity, flight path angle, and axial acceleration are similar to those for a planar re-entry, if the change in the vertical component of lift is taken into account. Thus, an equilibrium glide can be set up as before, and helps to maximize the lateral range.

For simplicity, the roll reference gyro will not receive torquing commands after re-entry. A roll command program would be necessary to keep the vehicle flying at a constant bank angle with respect to local horizontal, because of the earth's sphericity. However, a constant bank angle does not yield the maximum lateral range, and it turns out that the bank angles obtained by not torquing the roll gyro are more nearly optimum for maximizing lateral range.

Figure 6:
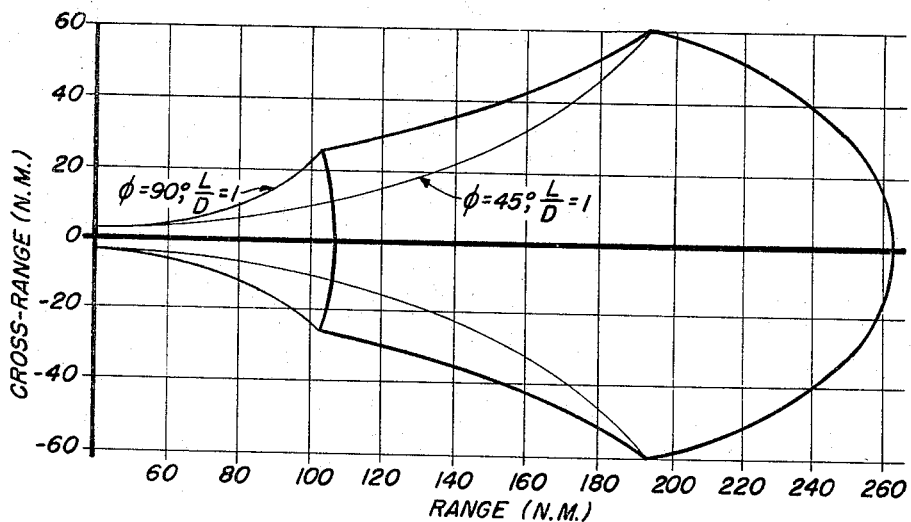
FIGURE 6 is a top view of the vehicle's trajectory during terminal guidance illustrating lateral maneuverability and the limits of accessible landing areas.

Use of this technique makes it extremely simple to change the vehicle's landing area at any time prior to deboost as shown in FIGURE 6. The airborne hardware need be only slightly more complicated than for the simplest of all re-entry missions, where there is no control of the landing area after launch. As mentioned above, the deboost time is used as the primary control of range. From a precomputed table, the ground computer can determine the combination of bank angle and $L/D$ which gives the desired lateral range. Each of the trajectories used for the table has the same vertical component of lift so that only one acceleration profile need be stored on board the vehicle.

Thus, as lateral range is increased, both the bank angle and the trim $L/D$ are increased. Maximum lateral range is obtained when the bank angle is 45° and when maximum trim $L/D$ is used. A planar re-entry then uses zero bank angle, and $$L/D = 0.707 \left(\frac{L}{D}\right)_{\max \text{ trim}}$$

Referring now to FIGURE 4, there is shown three trajectories which may occur after re-entry of a vehicle having a velocity of 35,000 ft./sec. The nominal trajectory curve is preferred and programmed since it leads from the planned re-entry conditions to the planned landing site. Should an emergency occur during a return, for example, from the moon, it is estimated that a vehicle will have an initial velocity of 36,000 ft./sec. The additional curves in FIGURE 4 illustrate a minimum pitch angle of 2.45° that will prevent the vehicle from skipping out of the atmosphere and into a long term orbit. The third curve illustrates a pitch angle of 6.4° which represents the maximum pitch angle for a given class of vehicles that could safely re-enter the atmosphere without being destroyed due to excessive g forces. The curves are included to show the capability of the system in reacting and handling an emergency and the possible error between a nominal re-entry and the two extremes.

FIGURE 6 is a curve illustrating the maneuverable range that the vehicle may reach from an altitude of 100,000 feet in the atmosphere. By using the graph of FIGURE 6, the pilot at an altitude of 100,000 feet places an overlay of the graph sometimes called a footprint, at his location. By viewing the terminal portions outlined by the footprint over a ground chart it is possible for the pilot to immediately determine whether his craft can be maneuvered to the desired and previously selected landing site. In addition, the information will also determine which new sites may be selected as a potential landing site.

This completes the description of the invention described herein. However, when considering the return of the vehicle to earth, it is desirable to plan the re-entry in the middle of the safe corridor. Calculations show that minimum range is determined by the acceleration level which the vehicle and its payload can tolerate.

The maximum range is not so limited since the trajectory can be planned so that the vehicle will skip out of the atmosphere with approximately satellite velocity, with the trajectory planned so that the vehicle will re-enter at the right location. Circumnavigation could be accomplished in this manner, even with a low lift vehicle.

Many other modifications and advantages will be apparent to persons skilled in the art without departing from the spirit and scope of this invention.

The embodiments of the invention in which an exclusive property or privilege is claimed are defined as follows:

1. A system for guiding a lift generating vehicle comprising
    means for measuring acceleration in the plane of symmetry of said vehicle as a function of dynamic pressure,
    means for measuring and controlling the roll attitude of said vehicle,
    a timer programmer having a pre-recorded indicia of simulated accelerations for a preferred trajectory of said vehicle,
    means during atmospheric flight of said vehicle for continuously comparing the measured acceleration against the output of said timer programmer to generate an error signal, and means responsive to said error signal for varying the lift generated by said vehicle in a preferred attitude whereby the landing position of said vehicle is accurately determined.

2. A system for guiding a lift generating vehicle comprising means for measuring acceleration on said vehicle as a function of dynamic pressure, means for determining and controlling pitch and roll attitude of said vehicle, a timer programmer having a pre-recorded indicia of simulated accelerations and roll commands for a preferred trajectory of said vehicle, and means during atmospheric flight of said vehicle for assuming the preselected roll position and for continuously comparing the measured acceleration against the simulated output of said timer programmer to generate an error signal, and means responsive to said error signal for varying the lift generated by said vehicle in a preferred attitude whereby the landing position of said vehicle is accurately determined.

3. A system for guiding a lift generating vehicle comprising means for measuring acceleration in the plane of symmetry of said vehicle, means for determining and controlling pitch and roll attitude of said vehicle, a timer programmer having a plurality of prerecorded indicia of simulated accelerations for preferred trajectory of said vehicle, and means during atmospheric flight said vehicle for continuously comparing the measured acceleration with the recorded programmed acceleration to substantially follow the output of a single set of indicia of said timer programmer by varying the lift generated by said vehicle in a preferred attitude whereby the landing position of said vehicle is accurately determined.

4. In combination, a re-entry vehicle having lifting means and adapted to orbit and re-enter an atmosphere encompassing planet, means for measuring acceleration in the plane of symmetry of said vehicle, means for measuring and controlling the roll attitude of said vehicle, a timer programmer having a pre-recorded indicia of simulated accelerations for a preferred re-entry trajectory of said vehicle in said atmosphere, means during re-entry of said vehicle for comparing the output of said timer programmer against the measured accelerations to generate an error signal and means responsive to said error signal for continually varying the lifting means on said vehicle in a preferred attitude whereby the landing position of said vehicle is accurately determined.

5. In combination, a re-entry vehicle having lifting means and adapted to orbit and re-enter an atmosphere encompassing planet, means for measuring acceleration as a function of dynamic pressure in the plane of symmetry of said vehicle, a timer programmer having a pre-recorded indicia of simulated accelerations for a preferred re-entry trajectory of said vehicle in said atmosphere, feedback means for monitoring the output of said timer programmer against the measured accelerations and generating an error signal, and control means responsive to said error signal for changing the dynamic pressure by controlling said lifting means on said vehicle in a preferred attitude whereby the landing position of said vehicle is accurately determined.

6. In combination, a re-entry vehicle having lifting means and adapted to orbit and re-enter an atmosphere encompassing planet, means for measuring acceleration in the plane of symmetry of said vehicle, means for determining and controlling the attitude of said vehicle with respect to the planet being orbited, a timer programmer having a pre-recorded indicia of simulated accelerations and attitude command signals for a preferred re-entry trajectory of said vehicle in said atmosphere, feedback means for monitoring the output of said timer programmer against the measured accelerations and generating an error signal, and autopilot means responsive to said error signal for changing the dynamic pressure by controlling said lifting means on said vehicle, said autopilot also receiving said attitude command signals for establishing the vehicle attitude conforming to the preferred trajectory whereby the landing position of said vehicle is accurately determined.

References Cited

UNITED STATES PATENTS

| | | | |
|---|---|---|---|
| 3,164,338 | 1/1965 | Cooper et al. | 244—14 |
| 3,188,019 | 6/1965 | Bontin | 244—14 |

FERGUS S. MIDDLETON, *Primary Examiner.*